000
United States Patent [19]

Shewmaker

[11] 4,293,348

[45] Oct. 6, 1981

[54] METHOD FOR REMOVING OIL-BASED MATERIALS FROM WATER SURFACE

[75] Inventor: James E. Shewmaker, Scotch Plains, N.J.

[73] Assignee: Exxon Research & Engineering Co., Florham Park, N.J.

[21] Appl. No.: 128,726

[22] Filed: Mar. 10, 1980

[51] Int. Cl.³ .......................... B01D 17/02; B08B 9/00
[52] U.S. Cl. .................................... 134/22 R; 134/40; 210/708; 210/749; 210/925
[58] Field of Search .......................... 134/10, 22 R, 40; 210/43, 59, 70, DIG. 27, 708, 749, 776, 767, 925

[56] References Cited

U.S. PATENT DOCUMENTS

| | | | |
|---|---|---|---|
| 2,442,100 | 5/1948 | Showalter | 134/22 R |
| 3,436,263 | 4/1969 | Strenkert | 134/22 R |
| 3,535,160 | 10/1970 | Argen | 134/22 R |
| 3,681,264 | 8/1972 | Prial | 210/DIG. 27 |
| 3,745,125 | 7/1973 | Marranci | 210/DIG. 27 |
| 3,746,023 | 7/1973 | Smith | 134/22 R |
| 3,959,134 | 3/1976 | Canevari | 210/59 |
| 4,197,197 | 4/1980 | Abaeva | 210/DIG. 27 |

FOREIGN PATENT DOCUMENTS 951618  3/1964  United Kingdom ............. 134/22 R

OTHER PUBLICATIONS

Zisman, The Spreading of Oils on Water, The Journal of Chemical Physics, vol. 9, No. 10, Oct. 1941, pp. 729–740.
Timmons, The Relation of Initial Spreading Pressure of Polar Compounds on Water to Interfacial Tension, Work of Adhesion, Journal of Colloid and Interface Science, vol. 28, No. 1, Sep. 1968, 106–117.
Surface Collecting Agents, Shell Oil Company, Mar. 1978.
Broad, "Studies in Cleaning Techniques", Symposium on Cleaning of Chemical Plant and Equipment by Liverpool Section of SCI., Jan. 21, 1971.
Watts, "How to Clean a Tank", Petroleum and Chemical Transportation, Nov. 1958, 7–11.

*Primary Examiner*—Ernest G. Therkorn
*Attorney, Agent, or Firm*—F. Donald Paris; Robert S. Salzman

[57] ABSTRACT

A method for removing oil-based materials floating on the surface of ballast water contained in the ballast tank of a cargo carrier having vertical steel surfaces is provided comprising adding to said surface a spreading agent having a spreading force greater than said oil-based material in an amount sufficient to force substantially all of said material against said surfaces; and discharging said ballast water from said tank at a point below the surface of said water, said oil-based material being forced to deposit on said steel surfaces vacated by said discharged water.

13 Claims, No Drawings

METHOD FOR REMOVING OIL-BASED MATERIALS FROM WATER SURFACE

BACKGROUND OF THE INVENTION

This invention is concerned with a process for removing floating oil-based materials from the surface of water contained in a tank and retaining said oily materials on the surfaces of the tank as the water is discharged. The invention is particularly concerned with the removal of oil-based materials from the surface of water contained in the steel tanks of cargo carriers such as tankers.

The present ballasting operations for crude oil tankers between the discharge port and the loading port comprise a three-step process. After oil cargo discharge in the discharge port, the tanker makes up its required departure ballast by taking on water ballast in addition to its segregated ballast. Usually this ballast is pumped to several wing tanks of the tanker and is designated as dirty ballast. At sea, enroute to the loading port, another set of tanks, usually two or three center tanks, is first washed and cleaned and then loaded with sea water. Such ballast is designated as clean ballast. This clean ballast contains substantially no oil within the water but may have a small amount of oil floating on its surface and is suitable for discharge at the loading port on arrival provided a substantial portion of the water is retained to avoid discharging the floating oil residues. Finally, the dirty ballast is discharged at sea following established procedures to prevent pollution and is essentially exchanged for the clean ballast. Such operations involve handling twice the amount of additional ballast required for the ballast passage and the time, cost and effort in handling such ballasting operations is considerable. For example, in the case of very large cargo carriers (VLCC), up to 60,000 tons of ballast, in addition to the segregated ballast, is required during a normal ballast passage. This means that another 60,000 tons of dirty ballast must be processed at sea, which processing involves substantial fuel consumption and man-hours.

One solution to the problem of first loading dirty ballast then clean ballast, and then unloading the dirty ballast would be to load clean ballast directly into tanks that have been properly cleaned at the discharge port either by crude oil washing only (COW); crude oil washing and water rinsing, or crude oil washing and water washing. A stripping operation is usually applied after cleaning to remove the oil heel left in the bottom of the tank. After directly loading the ballast at the discharge port any residual oil and possibly portions of the sludge remaining in the tanks floats on the surface of the ballast water.

To discharge direct-loaded clean ballast without threat of oil pollution, the residual oil and sludge floating on the ballast surface must either be removed from or retained in the ballast tank. Attempts have been made to develop various methods of mechanical skimming of the ballast surface, examples of which include moving beds of plastic foam across the ballast surface; using the ship's rolling motions, streams of air or water, or rising bubbles to drive oil over fixed and adjustable weirs built into a tank bulkhead; or moving fixed or tethered floating skimming units over the ballast surface. Such mechanical skimming methods have generally been unsatisfactory for a variety of reasons including the interference of the ship's motion, inability to effectively control the particular method and fouling of moving parts by accumulated sludge.

The field of surface films and spreading has been dealt with extensively in the art. Exemplary of this art is the treatment of this topic by William D. Harkins, entitled "The Physical Chemistry of Surface Films", Reinhold Publishing Corporation, 1952. Other reference material dealing with spreading of oils on water, spreading pressure and surface collecting agents include the following: (1) The Journal of Chemical Physics, Vol. 9, No. 10, pp. 729–741, October 1941; (2) Journal of Colloid and Interface Science, Vol. 28, No. 1, pp. 106–117, September 1968; and (3) "Surface Collecting Agents", Shell Oil Company, March 1978.

The present invention, on the other hand, provides a method for the chemical skimming of floating oil-based materials such as crude oil and sludge from the surface of water contained in a tank and retaining the oily materials on the surfaces of the tank as the water is discharged. The method is particularly useful for removing residual crude oil and sludge from the cleaned ballast tanks of tankers which have been directly loaded with ballast at the cargo discharge port following crude oil washing. It has been demonstrated in shipboard trials using the present method that the oil content in the discharged water was less than 15 ppm. even at low tank innages which content meets the proposed regulations of the Intergovenmental Consultative Organization (IMCO). It has also been demonstrated that the method is largely independent of the ship's motion, can be easily controlled, and is economical since it eliminates the fuel consumption attributable to ballast handling operations at sea. Other advantages of the method include reduction of the amount of water required for tank washings prior to taking on clean ballast, the elimination of dirty ballast altogether if tank cleaning and stripping operations are employed at the discharge port, and added protection against oil discharge in the event of poor tank washing for existing ballast handling procedures or failure to retain sufficient clean ballast to prevent the discharge of floating oil or sludge residues. In the case of tanks which have been crude oil washed only and then directly loaded at the discharge port, the need for water rinsing and other procedures for disposing of dirty ballast at sea may be substantially eliminated.

SUMMARY OF THE INVENTION

The present invention provides a method for removing oil-based materials such as crude oil films and emulsion deposits including sludge floating on the surface of water contained in metal tanks or coated metal tanks. The invention is particularly concerned with removing oil-based materials floating on the surface of clean ballast directly loaded into previously cleaned steel tanks of cargo carriers such as tankers at the discharge port. Such ballast can then be discharged at the loading port or at sea under substantially pollution free conditions, that is, having essentially no oil-based material in the discharge stream.

The method comprises adding to the ballast surface a spreading agent such as those materials heretofore used for coralling or herding oil spills at sea having a spreading force greater than the spreading force of the floating oil-based material. The spreading agent acts to compress the floating oil-based materials against the vertical steel surfaces of the tank such as tank bulkheads and vertical supporting structures. As the ballast is discharged, the oil-based material is pressed against and rubbed onto or forced to be deposited onto the oil-adsorbing steel surfaces vacated by the discharged water. In this manner substantially all the oil-based material previously floating on the ballast surface is retained in the tank. In measurements conducted on the discharged water from ballast operations using the method, less than 15 ppm. oil was found in the discharge water when the tank innage was reduced to a meter or less.

DETAILED DESCRIPTION OF THE PREFERRED EMBODIMENTS

The method of this invention, although useful for the chemical surface skimming of any body of water contained within a tank having vertical oil-adsorbing surfaces to remove floating oil-based material therefrom, is particularly useful for the removal of residual oil and sludge deposits floating on the surface of tanker ballast in steel tanks directly loaded at the discharge port.

Before directly loading clean ballast, the ballast tank is first cleaned either by crude oil washing, crude oil washing and water rinsing or crude oil washing and water washing. The present invention is particularly useful for the removal of oil and sludge deposits floating on the surface of directly loaded clean ballast contained in tanks which have previously been crude oil washed only or crude oil washed and water rinsed. During and following the normal cleaning operations, each tank is stripped of liquids using conventional stripping equipment to reduce as low as possible the oil "heel" left in the tank. To further reduce the amount of oil-based material to be ultimately removed from the ballast it is also preferred that a secondary stripping operation be conducted. It is also important that the cargo lines and pumps used in transferring water to the tanks be cleaned prior to the direct loading operation, or that dedicated ballast lines and pumps be used for ballast handling.

After loading the clean ballast, some oil-based material will normally be floating on the surface of the ballast. Such oil-based materials include thin layers of crude oil as well as oil emulsions such as clingage and sludge. Oil usually is found on the surface of the ballast as a film or as islands of oil in varying thicknesses. Sludge, on the other hand, can exist as clumps varying in size from about 1/10 cc to 28,000 cc. having as much of their volume extending below the water surface as above it. Before this ballast is deballasted in the loading port following the ballast passage, the process of the invention is applied by adding to the surface of the ballast a chemical which spreads spontaneously on a water surface, having a spreading force greater than the oil-based material on the ballast in an amount sufficient to compress substantially all oil-based material against the vertical steel bulkheads and other internal structures of the tank. The ballast is then discharged through a bellmouth located at the bottom of the tank. As the ballast is discharged, the compressed oil is forced onto the vertical oil-adsorbing steel surfaces vacated by the receding water so that substantially all the oil-based material is retained in the tank rendering the discharge essentially pollution-free.

The spreading agents useful in the present method comprise those classes of chemicals or materials which have the ability to spread on water and in so doing move oil-based deposits floating on the water surface. Because of their polar constituents, crude oils spread spontaneously and strongly upon water forming a sheen on its surface and have a spreading force determined by the composition of each particular crude oil. When a chemical or material which has a spreading force greater than the spreading force of the oil-based material is also placed upon the water surface, the chemical will spread preferentially, compressing the oil-based material to a smaller area and to a greater thickness. Some of the agents useful herein have been previously used for corraling or herding oil spills on water.

Measurements on several crude oils indicate that their spreading force on water is in the range of from about 28 to 35 mN/M (milli Newtons per meter). Thus, spreading agents having a spreading force greater than these forces are useful in the present method. Those having a spreading force greater than about 38 mN/M are particularly preferred since the magnitude of such forces provide an ample margin of spreading power to efficiently compress and move most any oil-based material including sludge. A spreading agent sold under the trademark Corexit OC-5 ® (Exxon Chemical) is particularly useful which spreading agent is generally described in U.S. Pat. No. 3,959,134, whose teachings are meant to be incorporated herein by way of reference. Such agent has a spreading force of between 42–43 mN/M, has low toxicity, long term stability and other desirable physical properties.

The amount of spreading agent to be added to the surface of the ballast water is not critical and should be sufficient to effect compression of substantially all oil-based material against the vertical surfaces of the tank. However, large excesses of agent should be avoided because they may impart a grey powder-like surface film on the surface of the sea. In the case of the spreading agent Corexit OC-5 ® in liquid form, it has been found that from about ½ to 2 g. per 100 square meters of ballast surface is a sufficient addition.

The spreading agent may be added to the ballast surface manually or automatically by use of a dispensing device which allows variable flow rates of agent.

The addition of agent to the tank should commence about 20 to 30 minutes before deballasting begins to allow the oil-based deposits to be compressed and accumulate at the tank walls. The addition is most effective when performed in loading port when the ballast surface is calm. The spreading agent, in addition to the oil-based materials also plates out on the tank's vertical surfaces during the course of deballasting. In order to provide sufficient amounts of agents for the increasing oil-free water surface during deballasting, the addition should be continued for a period of time after deballasting begins, e.g., the first 90 to 100 minutes of tank deballasting.

The location at which the spreading agent is added to the ballast surface may vary. However, addition at or near the center of each tank is preferred. If the ballast surface is partitioned by intervening tank structures, spreading agent should be applied to each separate section of ballast surface in order to compress all of the oil or oily materials present on the ballast.

After discharge of ballast, the oil-based material is retained on the tank vertical surfaces vacated by the water. During discharge, there occurs a surface flow in the fore-to-aft direction which may break up a body or bodies of materials compressed by the spreading agent into a number of islands. However such surface flow also heals this condition by causing the islands to collide with other bodies of oil-based material on the aft bulkhead, and thence to coalesce or become attached to the bulkhead to be plated out. A similar effect occurs if deballasting is carried out at sea. If deballasting is conducted while the cargo carrier is rolling and pitching, the rate of discharge of the last 2 to 3 meters of innage should be as slow as possible and the last 40 to 60 cm of innage should be stripped to a slop tank.

Any oil which may not be transferred from the ballast to the steel vertical surfaces and remains on the water is retained on the tank bottom or on the rust, sediment or sludge deposits on the tank bottom.

It has been found that the vertical steel surfaces of cargo carrier tanks, because of their oil adsorbing or oleophilic properties, are ideally suited for retaining the oil-based deposits compressed by the spreading agents. However, other metal or non-metallic surfaces having this property may be similarly employed.

The following Examples are submitted to further illustrate the invention.

EXAMPLES 1 TO 7

In these examples, a number of shipboard trials were conducted using the present method to remove and retain oil layers floating on the surface of clean ballast located in the center tanks of a tanker. In all cases, the vessels were at anchor or moored during discharge of ballast and all tanks were cleaned and stripped prior to taking on clean ballast. The percent ballast surface covered with oil-based material before addition of spreading agent was determined in most cases, both for thick and thin oil layers and the meters of ballast innage was determined when the oil in the discharged ballast just exceeded 15 ppm. Table 1 below summarized the results of those trials.

TABLE 1

| EXAMPLE | TANK NO. | PERCENT BALLAST SURFACE COVERED WITH OIL BEFORE ADDITION OF SPREADING AGENT | | MILLILITERS OF SPREADING AGENT USED (Corexit OC-5) ® | METERS INNAGE WHEN OIL IN DISCHARGED BALLAST EXCEEDED 15 PPM. |
|---|---|---|---|---|---|
| | | Thick Oil Layer | Thin Oil Film | | |
| 1 | 1 C | 5 | 95 | 410 | 0.3 |
| 2 | 3 C | not determined | not determined | 375 | 0.5 |
| 3 | 3 C | not determined | not determined | 1000 | 0.1 |
| | 3 C | not determined | not determined | 1000 | 1.0 |
| 4 | 3 C | 0 | 100 | 1000 | 0.5 |
| | 4 C | 0 | 100 | 1000 | 0.5 |
| 5 | 1 C | 0 | 100 | 1000 | 0.3 |
| | 3 C | 0 | 100 | 1000 | 0.3 |
| | 4 C | 0 | 100 | 1000 | 0.3 |
| 6 | 6 C | 90 | 10 | 400 | 0.3 |
| 7 | 1 C | 80 | 20 | 285 | 0.1 |

As Table 1 shows, ballast could be discharged to innages varying from 10 cm to 1 M without exceeding 15 ppm. oil which amounts to an essentially pollution-free discharge. In many other trials it was found that ballast following chemical skimming according to the present invention can be discharged to an innage of 40 cm or less without incurring visible oil release provided the tank washing and line cleaning operations are properly done.

EXAMPLE 8

The effectiveness of the present method in recovering floating oil was demonstrated in this Example by observing the oil plated out on the bulkheads of tanks from ballast containing oil-based material which were treated according to the present method and comparing these observations for similar ballast having no treatment.

It was found that in tanks in which the ballast had been treated prior to discharge according to the present method, there was a sharp line of heavy oil deposition on the bulkheads at precisely the innage at which the spreading agent was added. In addition there were chunks of plated out sludge emulsion on the sides of the tank which had obviously slid down the bulkhead for various distances, leaving a wake of their substance behind them, a clear indication of their movement and transfer to the bulkheads by the present chemical skimming process.

In the case of untreated ballast, the oil stains in the bulkheads were erratic, thin-streaked or barely noticeable. Sludge emulsion was not found plated out on the bulkheads in significant amounts.

EXAMPLE 9

In this Example a ballast tank having been crude oil washed and bottom rinsed was directly loaded with clean ballast. About three meters of ballast innage was discharged from the tank without any treatment of the oil-based material floating on the surface of the ballast.

A small amount of Corexit OC-5 ® was then added to the ballast surface and the ballast discharged according to the method of the present invention.

It was found that little oil and no sludge emulsion was collected on the tank bulkheads during deballasting prior to applying the present method, but that a heavy line of deposition of both oil and sludge emulsion was formed on the bulkheads beginning at the innage level at which the present method was begun.

What is claimed is:

1. A method for removing oil-based materials floating on the surface of ballast water contained in the ballast tank of a cargo carrier having vertical steel surfaces comprising:
(a) adding to said surface a spreading agent having a spreading force greater than 38 mN/M in an amount sufficient to force substantially all said material against said surfaces; and
(b) discharging said ballast water from said tank at a point below the surface of said water, said oil-based material depositing on said steel surfaces vacated by said discharged water.

2. The method of claim 1 wherein said oil-based material is selected from the group consisting of crude oil and sludge.

3. The method of claim 1 wherein said spreading agent is centrally added to the ballast water surface.

4. The method of claim 1 which further comprises adding additional spreading agent to said surface during discharging.

5. A method for loading and discharging ballast water from a crude-oil depleted ballast tank of a cargocarrier having vertical steel surfaces comprising:

(a) cleaning said tank to remove substantial amounts of oil-based materials;

(b) adding clean ballast water to said tank wherein residual oil-based materials in said tank float on the surface of said ballast water;

(c) adding to said ballast water surface a spreading agent having a spreading force greater than that of said oil-based materials in an amount sufficient to force substantially all said materials against said steel surfaces; and (d) discharging said ballast water from said tank at a point below the surface of said water, said oil-based materials being forced by said agent to deposit on said steel surfaces vacated by said discharged water.

6. The method of claim 5 wherein said cleaning comprises washing said tank with crude oil.

7. The method of claim 6 wherein said cleaning further comprises stripping said tank to substantially remove residual oil heel.

8. The method of claim 5 wherein said oil-based materials are selected from the group consisting of crude oil and sludge.

9. The method of claim 5 wherein said spreading agent has a spreading force greater than 38 mN/M.

10. A method for the direct loading and discharge of clean ballast from a crude oil depleted tank of a cargo carrier having vertical steel surfaces comprising:

(a) crude oil washing and water rinsing said tank;

(b) stripping said tank to remove residual oil heel;

(c) adding clean ballast water to said tank wherein any residual oil-based material remaining in said tank floats on the surface of said ballast water;

(d) adding to the surface of said ballast water a spreading agent having a spreading force greater than about 38 mN/M in an amount sufficient to force substantially all said material against said steel surfaces; and (e) discharging said ballast water from said tank at a point below the surface of said water; said oil-based material being forced to deposit on said steel surfaces vacated by said discharged water.

11. The method of claim 10 wherein said oil-based material is selected from the group consisting of crude oil and sludge.

12. The method of claim 10 wherein said spreading agent is centrally added to said ballast water surface.

13. The method of claim 10 which further comprises adding additional spreading agent to said surface during discharging.

* * * * *